UNITED STATES PATENT OFFICE.

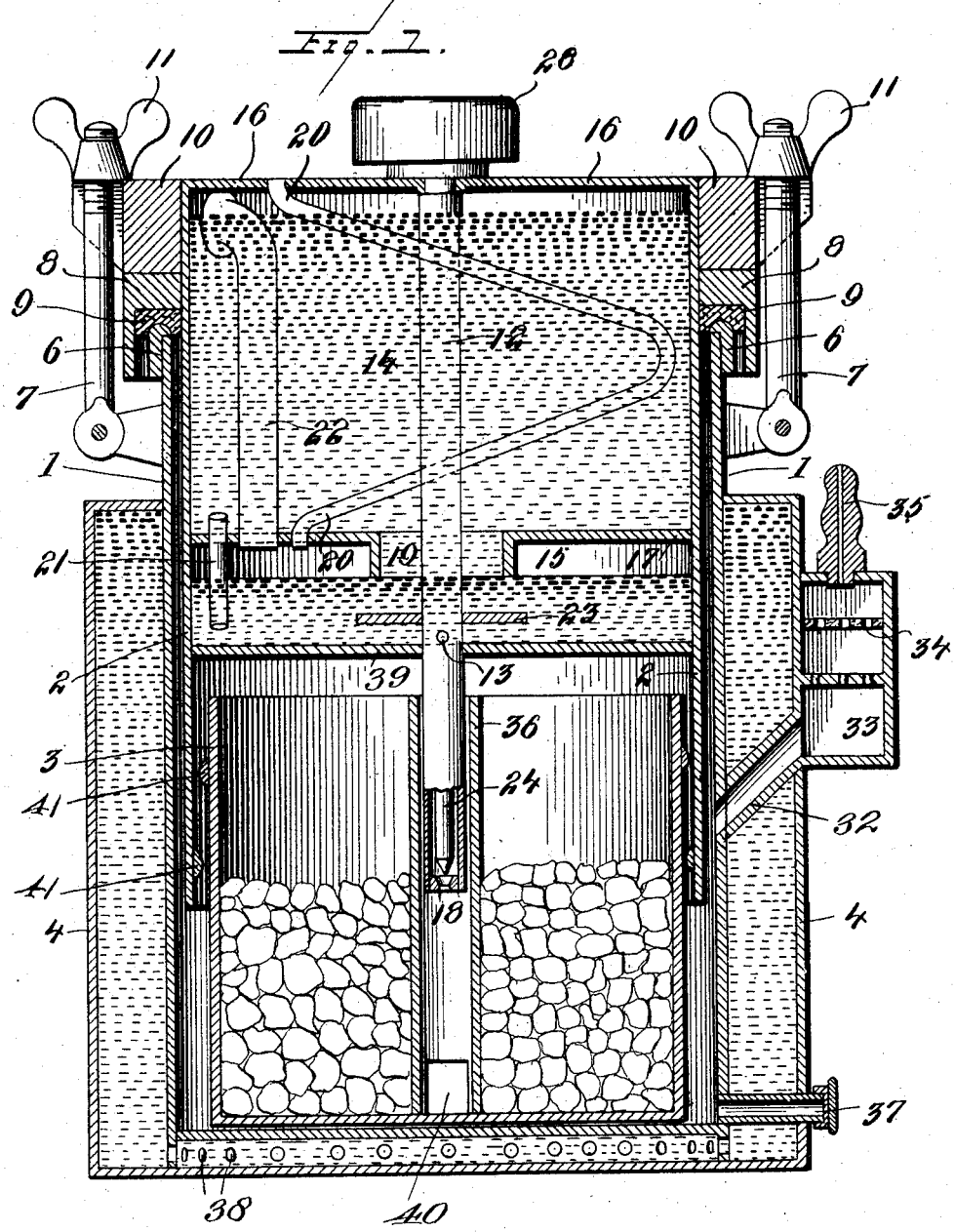

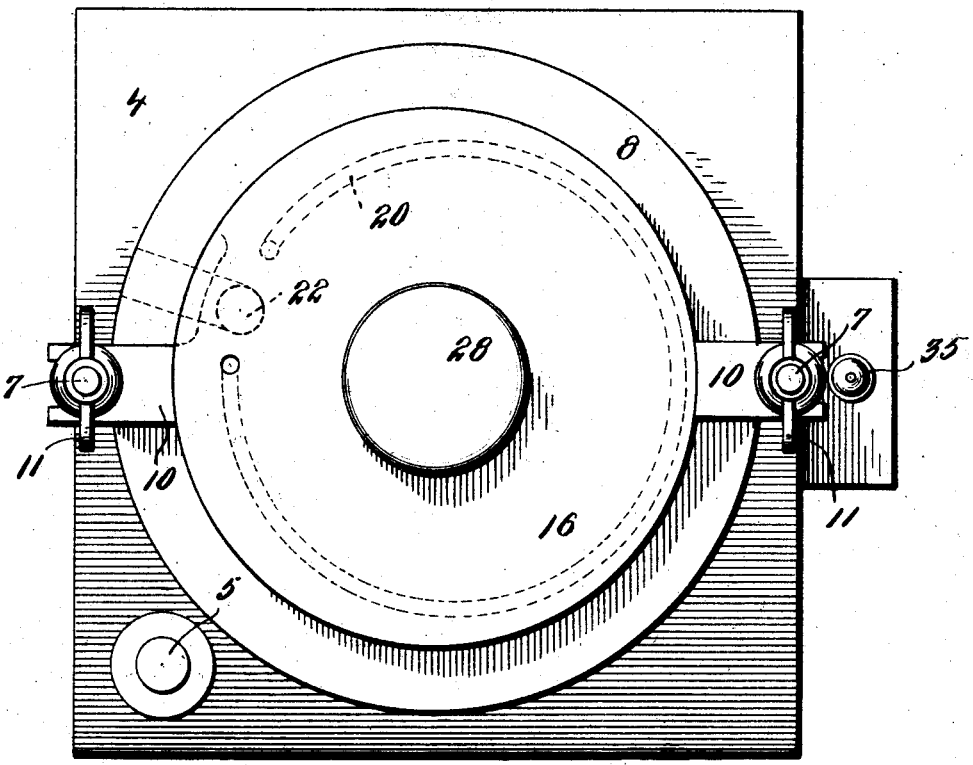

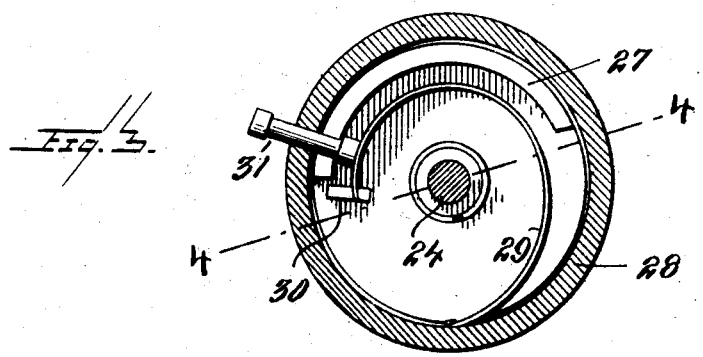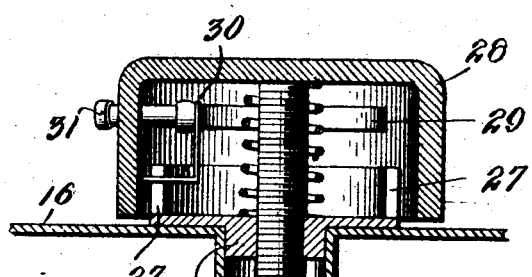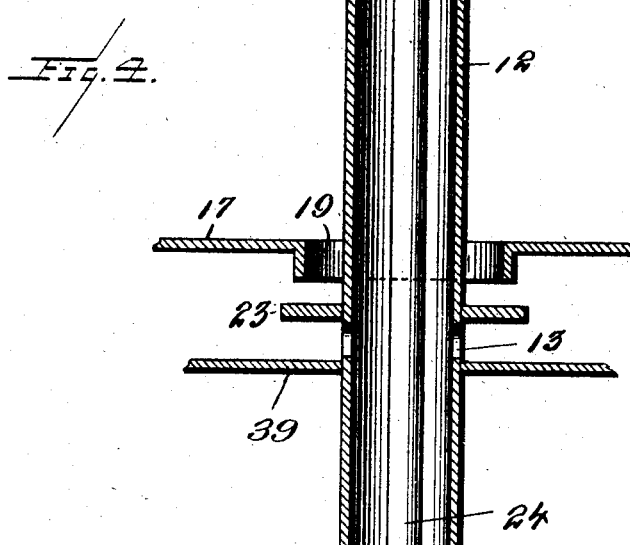

LOUIS TROUBETZKOY, OF MILAN, ITALY.

PORTABLE ACETYLENE-GENERATOR.

No. 905,767.  Specification of Letters Patent.  Patented Dec. 1, 1908.

Application filed June 28, 1907. Serial No. 381,349.

*To all whom it may concern:*

Be it known that I, LOUIS TROUBETZKOY, a subject of the King of Italy, residing at Milan, Italy, have invented a new and useful Improvement in Portable Acetylene-Generators, of which the following is a specification.

My invention relates to improvements in portable acetylene gas generators, and the object of my invention is to provide a simple apparatus of this type in which the pressure is automatically kept constant.

With this object in view, my invention consists in the construction and combinations of parts as hereinafter described and claimed.

In the accompanying drawings—Figure 1 is a central vertical section of my improved generator. Fig. 2 is a plan view thereof. Fig. 3 is a horizontal section of the upper part of the valve mechanism, and Fig. 4 is a vertical section of said valve and the associated parts.

1 represents a cylindrical open-top vessel for the reception of the carbid container 3. This vessel is provided with an imperforate bottom and an extension thereon provided with holes 38.

2 represents the water reservoir which is divided into two chambers 14 and 15 by the partition 17, these two chambers being connected by the cylindrical passage 19. The bottom of the chamber 15 is closed by the wall 39 and the lower end of the vessel 2 is open. The lower end of the vessel 1 is surrounded by a metal box 4, provided with a hole 5 at its top closed by a screw plug. Through this hole water may be poured to keep the vessel cool, and this cooling water passes through the holes 38 under the bottom of the vessel 1.

Knobs or bosses 41 are located on the outside of the carbid container 3 and on the inside of the water reservoir 2, and serve to maintain an open passage between these parts.

Attached to, or made integral with, the top part of the vessel 1 is a hoop 6 for strengthening the top, since the water containing vessel 2 is wholly supported on this top. Projecting from the sides of the vessel 1, near its top, are brackets to which are pivoted bolts 7, each having a wing nut 11 at its top.

The vessel 2, which carries the water, is slightly smaller in diameter than the vessel 1. Near its top the vessel 2 carries a collar 8 in the shape of an inverted L, which is adapted to fit around and rest upon the top of the vessel 1, a rubber packing 9 being inserted between the hoop 6 and collar 8. The water vessel 2 is tightly closed by the top 16 and the wall 39 except as hereinafter specified. The top 16 is provided with a ring 10 having slotted projections within which the bolts 7 are adapted to swing, and then by means of the nuts 11 the whole may be tightly clamped together.

The water vessel 2 is provided with three pipes 20, 21 and 22. The pipe 20 is bent, as shown in Figs. 1 and 2, the top connecting with the atmosphere and the bottom connecting with the chamber 15. The pipe 21 is a short pipe passing through the partition 17 and connecting the chambers 14 and 15. The pipe 22 passes through the partition 17 and out through the wall of the vessel 2, near its top and through the ring 10, and connects the chamber 15 with the atmosphere.

The means for regulating the water pressure will now be described.

Made flush with the top 16 of the vessel 2 and passing through the wall 39 so as to make a tight joint, is a tube 12, the lower end of which is closed by a plug having a valve seat 18. This tube is provided with a series of perforations 13 located above the partition or wall 39 so that the water may pass from the chamber 15 down through the tube 12 into the carbid container. Within the tube 12 is a valve rod 24, the lower part of which is conical and shaped so as to exactly fit the valve seat 18. The upper part of the rod 24 is screw-threaded, as shown at 25, and passes through a disk 26 which closes the upper part of the tube 12 and is soldered to said tube and the top 16 of the vessel 2. The disk 26 is provided with an upwardly projecting extension 27 forming a part of an annular wall, which, however, extends less than half way around said disk, as shown in Fig. 3. To the upper part of the screw-threaded portion 25 of the rod 24 is fixed an operating part 28, made in the form of an open bottom cylinder, which projects down around the wall 27. A spring 29 is fixed at one end to the cylinder or cap 28, and the free end of this spring carries a hook 30 which is adapted to engage with the wall 27. The cap 28 is perforated near the free end of said spring, and through the perforation passes a headed rod 31.

Obviously from the construction described, the cap 28 may be moved a certain distance to lift the valve rod 24 from its seat, but the amount of the rotation of this cap is limited by the wall 27. If, however, it should become desirable to rotate the cap 28 more than one-half of a revolution, the rod 31 is pressed in, disengaging the hook 30 from the wall 27, whereupon the cap 28 may be revolved indefinitely.

The lower end of the tube 12 projects downwardly into a central tube 36 of the carbid holder 3, and the tube 36 is provided at its lower end with an opening 40, whereby the water may reach the carbid.

To the pipe 12, above the holes 13, is fastened a disk 23, larger than the opening 19 connecting the chambers 14 and 15, in order to prevent any gas, if the production thereof should be too violent, from passing up into the chamber 14. The disk 23 will deflect any excess of gas into the upper part of the chamber 15, and the gas will then pass out through the tube 20 into the atmosphere.

35 represents a burner, or any delivery device for the gas, which is connected with a box 33 fixed on the side of the vessel 4. This box is provided with a series of perforated diaphragms 34, and is connected by means of a pipe 32 with the vessel 1.

37 represents a small pipe for the purpose of conducting away any moisture which may collect on the inside of the vessel 1, preferably closed by means of a leather packed plug.

One important feature of my invention is to keep the pressure of the gas supplied practically constant, and this is done by the automatic regulation of the amount of water supplied to the carbid by the means already described.

After the apparatus has been assembled, as shown in Fig. 1, the cap 28 is turned and water allowed to flow in through the lower end of the tube 12 into the carbid receiver, causing the formation of gas. The amount of water delivered into the carbid receiver depends upon two things, the amount of movement of the cap 28 which opens the valve mechanism, and the pressure of water in the chamber 15. The amount of movement of the cap 28 is regulated by the means already described, and the head of water is maintained in the chamber 15 at the level shown, thus giving a constant head of water. The chamber 14 being air-tight, the water therein cannot go down into the chamber 15 unless the level of the water in the chamber 15 is below the lower end of the passage 19, in which case air coming down through the tube 20 would bubble up into the chamber 14 until the level of water in the chamber 15 is again brought back to the point shown in Fig. 1. Until the level of the water in the chamber 15 is below the lower end of the passage 19, water cannot pass from the chamber 14 to the chamber 15, as this would cause a vacuum in the upper part of the chamber 14. By these means the head of water and position of valve are kept practically constant, thereby rendering the pressure of gas produced also practically constant.

The apparatus is assembled in the following manner: The vessel 1 is put into the vessel 4 and water is then poured in through the opening 5. The carbid receptacle is then placed in position in the lower part of the vessel 1. The vessel 2 is then turned on its side and water is poured in through the pipe 22, entering the chamber 15, and from thence passing into the chamber 14. This keeps on until the water has risen above the passage 19, when the flow of water into the chamber 14 would be stopped on account of the air confined therein, were it not for the tube 21 which conducts the air from the chamber 14 into the chamber 15 and then the tube 20 conducts the air to the atmosphere. Water is then poured in until the vessel 2 is very nearly full. Of course, during all this time the valve seat 18 is engaged by the lower end of the valve rod 24. The vessel 2 is then inserted into the vessel 1, the tube 12 going down into the tube 36. The bolts 7 are then swung up and the nuts 11 turned, fastening the whole device firmly together. To clean the apparatus these steps are performed in the inverse order, and the parts after being cleaned and a new charge of carbid put into the container are again assembled as shown in Fig. 1.

I claim:—

1. In an acetylene gas generator, the combination of a containing vessel, a carbid receiver therein and a water holder also arranged to fit therein, said water holder being divided into two chambers, the upper chamber being air-tight except as it communicates with the lower chamber, and said lower chamber being separated from said upper chamber by a perforated partition, and a bent pipe having open ends connecting said lower chamber with the atmosphere, substantially as described.

2. In an acetylene gas generator, the combination of a containing vessel, a carbid holder therein, and a two-part water holder adapted to fit into and be fastened in the upper part of said vessel, said water holder being provided with a centrally perforated partition connecting the two chambers thereof, a short pipe passing through said partition, a bent pipe passing through said partition and communicating with the atmosphere, to keep the pressure in said chamber at atmospheric pressure, and a filling tube for said water holder, substantially as described.

3. In an acetylene gas generator, the combination of a containing vessel, a carbid receiver in said vessel, and a two-part water holder adapted to be fitted into said vessel, and means for securing said water holder in said vessel and forming a tight joint therebetween, said water holder being provided with a centrally perforated partition dividing the same into two parts with a short pipe open at both ends passing through said partition, and with a bent pipe connecting the lower chamber of said water holder with the atmosphere, substantially as described.

4. In an acetylene gas generator, the combination of a containing vessel, a carbid receiver therein, a water holder fitting within said vessel, and valve mechanism for controlling the flow of water from said water holder to said receiver, consisting of a tube passing through said water holder and provided with a side inlet and a valve or seat at its lower end, a valve rod adapted to contact with said seat, means for turning said valve rod, a spring preventing the rotation, under ordinary circumstances, of said valve rod more than a limited distance, and means for moving said spring aside to permit free rotation of said valve rod, substantially as described.

In witness whereof I have hereunto set my hand in presence of two witnesses.

LOUIS TROUBETZKOY.

Witnesses:
 OSVALDO BELLXVOTA,
 FREDERICK SANTI.